(12) United States Patent
Baba et al.

(10) Patent No.: US 10,977,944 B2
(45) Date of Patent: *Apr. 13, 2021

(54) APPARATUS AND METHOD FOR SUPPORTING COLLISION AVOIDANCE OF VEHICLE

(71) Applicant: DENSO CORPORATION, Kariya (JP)

(72) Inventors: Takahiro Baba, Kariya (JP); Takaharu Oguri, Kariya (JP); Yosuke Ito, Kariya (JP); Kei Kamiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 227 days.

This patent is subject to a terminal disclaimer.

(21) Appl. No.: 15/855,896

(22) Filed: Dec. 27, 2017

(65) Prior Publication Data

US 2018/0182247 A1 Jun. 28, 2018

(30) Foreign Application Priority Data

Dec. 27, 2016 (JP) .............................. JP2016-253104

(51) Int. Cl.
*B60W 30/14* (2006.01)
*G08G 1/16* (2006.01)
(Continued)

(52) U.S. Cl.
CPC ................ *G08G 1/166* (2013.01); *B60T 7/22* (2013.01); *B60W 30/09* (2013.01);
(Continued)

(58) Field of Classification Search
CPC .............. G08G 1/166; G06K 9/00791; G06K 9/00805; B60W 30/0953; B60W 30/09;
(Continued)

(56) References Cited

U.S. PATENT DOCUMENTS 9,805,601 B1 * 10/2017 Fields .............. G08G 1/096791
10,145,684 B1 * 12/2018 Tofte ..................... G06Q 40/08
(Continued)

FOREIGN PATENT DOCUMENTS

JP S58-015300 U 1/1983
JP H07-129900 A 5/1995
(Continued)

*Primary Examiner* — Masud Ahmed
(74) *Attorney, Agent, or Firm* — Maschoff Brennan

(57) ABSTRACT

A vehicle collision avoidance support apparatus includes a state determination unit configured to determine whether or not there is a state where a moving object proceeding in a direction intersecting with a traveling direction of a vehicle may exist; a first sensor configured to detect an object in front of the vehicle; and an avoidance operation control unit configured to cause the vehicle to perform a predetermined avoidance operation for avoiding a collision according to a detection result of the first sensor within a determination region in front of the vehicle. The avoidance operation control unit uses a region that is wider in a direction perpendicular and horizontal to the travelling direction as the determination region when it is determined that there is a state where the moving object may exist in comparison with when it is determined that there is no state where the moving object may exist.

11 Claims, 11 Drawing Sheets

(51) Int. Cl.
    *B60T 7/22*         (2006.01)
    *G06K 9/00*       (2006.01)
    *B60W 30/095*    (2012.01)
    *B60W 30/09*     (2012.01)
    *B60W 40/04*     (2006.01)

(52) U.S. Cl.
    CPC .... *B60W 30/0953* (2013.01); *B60W 30/0956* (2013.01); *G06K 9/00791* (2013.01); *G06K 9/00805* (2013.01); *B60T 2201/03* (2013.01); *B60T 2210/20* (2013.01); *B60T 2210/32* (2013.01); *B60T 2250/03* (2013.01); *B60T 2250/04* (2013.01); *B60W 40/04* (2013.01); *B60W 2420/42* (2013.01); *B60W 2420/52* (2013.01); *B60W 2520/14* (2013.01); *B60W 2540/18* (2013.01); *B60W 2552/30* (2020.02); *B60W 2554/00* (2020.02)

(58) Field of Classification Search
    CPC ......... B60W 30/0956; B60W 2552/30; B60W 2554/00; B60W 40/04; B60W 2420/52; B60W 2420/42; B60W 2520/14; B60W 2540/18; B60T 7/22; B60T 2250/04; B60T 2201/03; B60T 2210/20; B60T 2210/32; B60T 2250/03

USPC .......................................................... 701/93
See application file for complete search history.

(56) References Cited

U.S. PATENT DOCUMENTS

| | | | | |
|---|---|---|---|---|
| 10,227,071 | B2* | 3/2019 | Nishimura | B60W 10/18 |
| 10,266,176 | B2* | 4/2019 | Nishimura | B60W 10/18 |
| 10,355,365 | B2* | 7/2019 | Izadian | G01S 13/426 |
| 2009/0265193 | A1* | 10/2009 | Collins | G06Q 30/0185 |
| | | | | 705/4 |
| 2015/0197248 | A1* | 7/2015 | Breed | G08G 1/09626 |
| | | | | 701/93 |
| 2016/0185348 | A1* | 6/2016 | Miura | B60W 30/0953 |
| | | | | 701/41 |
| 2016/0193999 | A1 | 7/2016 | Sasabuchi | |
| 2016/0357262 | A1* | 12/2016 | Ansari | G06F 3/017 |
| 2019/0039616 | A1* | 2/2019 | Leff Yaffe | H04W 4/027 |

FOREIGN PATENT DOCUMENTS

| | | |
|---|---|---|
| JP | 2005/138748 A | 6/2005 |
| JP | 2008/152389 A | 7/2008 |
| JP | 2014/106147 A | 6/2014 |

\* cited by examiner

SECOND EXEMPLARY EMBODIMENT

APPARATUS AND METHOD FOR SUPPORTING COLLISION AVOIDANCE OF VEHICLE

CROSS-REFERENCE TO RELATED APPLICATION

This application claims priority to and the benefit of Japanese Patent Application No. 2016-253104 filed in the Japanese Patent Office on Dec. 27, 2016, the entire contents of which are incorporated herein by reference.

BACKGROUND

Technical Field

The present disclosure relates to an apparatus and method for supporting collision avoidance of a vehicle.

Background Art

When objects having a high collision probability such as another vehicle, pedestrian, and the like in front of an own vehicle are detected by using a millimeter-wave radar and a camera so as to avoid a collision between the own vehicle and another vehicle or between the own vehicle and the pedestrian, a plurality of collision avoidance support devices automatically performing an alert, a brake function, and the like have been proposed. Patent document 1 discloses a collision avoidance support device that is not only capable of determining from which direction, a left side or a right side, another vehicle is approaching on a road intersecting with a road where the own vehicle is travelling at an intersection, and but also capable of performing the alert at a timing in response to an approaching direction.

RELATED ART DOCUMENT

Patent Document

[Patent Document 1] Japanese Patent Publication No. 2016-126400

The above information disclosed in this Background section is only to enhance the understanding of the background of the disclosure and therefore it may contain information that does not form the prior art that is already known to a person of ordinary skill in the art.

According to a collision avoidance support device of Patent document 1, it is required to detect a relatively wide range from radar measurement data and image data captured by a camera so as to detect whether or not there exists another vehicle travelling on a road intersecting with a road where an own vehicle is travelling and having a high probability of colliding with the own vehicle at an intersection. However, in the case of the collision avoidance support device of Patent document 1, even though a vehicle travels on a portion of a road where the intersection does not exist, a wide range detection is configured to be executed so as to detect another vehicle, which is the same process as a case where the intersection exists. For this reason, for example, another vehicle having a low probability of colliding with the own vehicle travelling on a straight road, and/or another vehicle travelling in a parking lot positioned in a vicinity of a road may be detected, thereby resulting in an incorrect detection. Accordingly, it has been required to provide a collision avoidance support device that is capable of accurately detecting a moving object proceeding in a direction intersecting with a travelling direction of the own vehicle and having a high collision probability.

SUMMARY

The present disclosure according to embodiments described hereinafter has been made in an effort to provide a vehicle collision avoidance support device and a vehicle collision avoidance support method so as to overcome at least one part of the drawbacks described hereinabove.

At least one embodiment according to the present disclosure provides a vehicle collision avoidance support device 100, including: a state determination unit 11 configured to determine whether or not there is a state where a moving object proceeding in a direction intersecting with a traveling direction FD of a vehicle may exist; a first sensor 21 and 22 configured to detect an object in front of the vehicle; and an avoidance operation control unit 12 configured to cause the vehicle to perform a predetermined avoidance operation for avoiding a collision according to a detection result of the first sensor within a determination region in front of the vehicle, wherein the avoidance operation control unit uses a region that is wider in a direction perpendicular and horizontal to the travelling direction as the determination region when it is determined that there is a state where the moving object may exist in comparison with when it is determined that there is no state where the moving object may exist.

According to embodiments of the present disclosure, a region that is wider in a direction perpendicular and horizontal to the travelling direction may be used as the determination region when it is determined that there is a state where a moving object proceeding in a direction intersecting with a traveling direction of a vehicle may exist in comparison with when it is determined that there is no state where the moving object may exist, thereby making it possible to accurately detect the moving object proceeding in the direction intersecting with the travelling direction of the vehicle and having a high collision probability. Furthermore, a region that is narrower in the direction perpendicular and horizontal to the travelling direction may be used as the determination region when it is determined that there is no state where the moving object proceeding in the direction intersecting with the traveling direction of the vehicle may exist in comparison with when it is determined that there is the state where the moving object proceeding in the direction intersecting with the traveling direction of the vehicle may exist, thereby not only suppressing an incorrect detection of a moving object which is not really proceeding in the direction intersecting with the travelling direction of the vehicle and having a high collision probability, but also accurately detecting a moving object actually proceeding in the direction intersecting with the travelling direction of the vehicle and having the high collision probability The present disclosure may be implemented in various forms other than the vehicle collision avoidance support device. For example, the present disclosure may be implemented in the form of a vehicle collision avoidance support method and a vehicle mounted with the vehicle collision avoidance support device, or a computer program for implementing the device and the method, and the like.

DETAILED DESCRIPTION OF THE EMBODIMENTS

Various exemplary embodiments will now be described according to the accompanying drawings.

A. First Exemplary Embodiment

Figure 1:
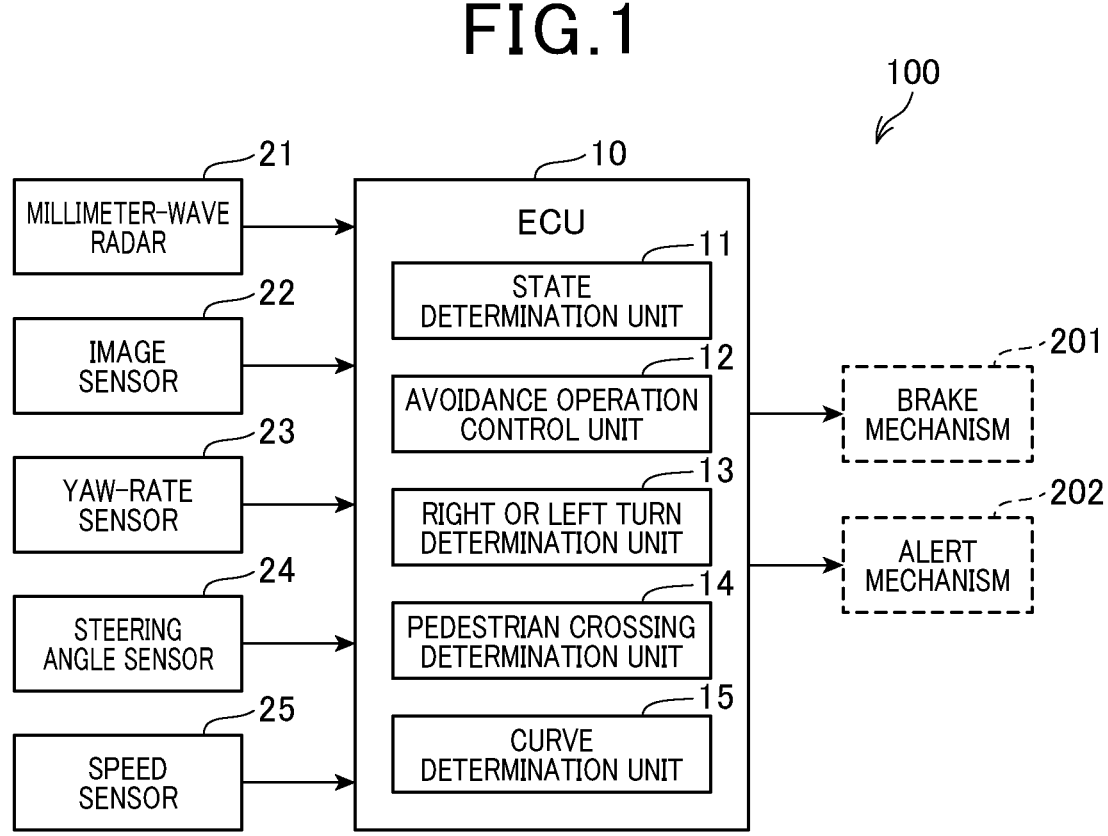
FIG. 1 is a schematic block diagram illustrating a configuration of a vehicle collision avoidance support device according to an exemplary embodiment of the present disclosure.

A1. Device Configuration:

As shown in FIG. 1, there is provided an apparatus 100 for supporting collision avoidance of a vehicle, which is now referred to as a vehicle collision avoidance support device. In this apparatus 100, a method of supporting collision avoidance of a vehicle is also carried out.

A vehicle collision avoidance support device 100 according to a first exemplary embodiment is mounted on a vehicle which is not shown and will be described as a vehicle 300 and determines whether or not there exists another vehicle, a pedestrian, and the like, all of which have a probability of colliding with an own vehicle, after which when approaching another car and pedestrian, and the like are detected, a collision avoidance operation is performed to the own vehicle. The collision avoidance operation will be hereinafter described. The vehicle collision avoidance support device 100 is provided with an ECU (Electronic Control Unit) 10, a millimeter-wave radar 21, an image sensor 22, a yaw-rate sensor 23, a steering angle sensor 24, and a speed sensor 25.

The ECU 10 controls the collision avoidance operation. The ECU 10 is electrically connected to the millimeter-wave radar 21, the image sensor 22, the yaw-rate sensor 23, the steering angle sensor 24, and the vehicle speed sensor 25, and receives detection results of the respective devices. Furthermore, the ECU 10 is electrically connected to a brake mechanism 201 and an alert mechanism 202. The brake mechanism 201 includes a brake system (not shown) of the own vehicle and another ECU (not shown) for controlling the brake system thereof. The alert mechanism 202 includes a speaker (not shown) mounted on the own vehicle and a display unit (not shown), and another ECU (not shown) for controlling the speaker and the display unit. The display unit, for example, may be configured as a part of an instrument panel installed at a passenger compartment.

The ECU 10 includes a CPU, a ROM, and a RAM. The CPU loads a control program previously stored in the ROM into the RAM and executes the control program, thereby performing functions as a state determination unit 11, an avoidance operation control unit 12, a right or left turn determination unit 13, a pedestrian crossing determination unit 14, and a curve determination unit 15.

The state determination unit 11 determines whether or not there is a state where a moving object proceeding in a direction intersecting with a travelling direction of the own vehicle may exist. In the exemplary embodiment, the state where the moving object proceeding in the direction intersecting with the travelling direction of the own vehicle may exist means the state where the own vehicle may exist in a vicinity of an intersection or within an intersection. In the vicinity of the intersection or within the intersection, a road intersecting with a road where the own vehicle proceeds may exist, and another vehicle travelling on the road or a pedestrian walking on a sidewalk next to the road, and the like may exist.

The avoidance operation control unit 12 performs a collision avoidance support process, which will be described later, by using detection results of the respective sensors electrically connected to the ECU 10 such as the millimeter-wave radar 21, the image sensor 22, the yaw-rate sensor 23, the steering angle sensor 24, and the vehicle speed sensor 25, thereby performing the collision avoidance operation in a manner of controlling the brake mechanism 201 and the alert mechanism 202.

The right or left turn determination unit 13 determines whether or not the own vehicle performs a right turn or a left turn by using the detection results of the yaw-rate sensor 23 and the steering angle sensor 24.

The pedestrian crossing determination unit 14 determines whether or not a pedestrian crossing exists in front of the own vehicle by using the detection result of the image sensor 22.

The curve determination unit 15 determines whether or not the own vehicle is travelling in a curve by using the detection results of the yaw-rate sensor 23 and the steering angle sensor 24.

The millimeter-wave radar 21 uses radio waves in a millimeter wave band, thereby not only determining whether or not there exists any object in front of the own vehicle, such as a preceding vehicle, an oncoming vehicle, a vehicle travelling on an intersecting road, a pedestrian, a guard rail, a manhole, a traffic light, etc., but also detecting a distance between the object and the own vehicle, a position of the object, a size thereof, and a relative velocity thereof with respect to the own vehicle. Furthermore, more specifically, the object is detected as a plurality of detection points (targets). Therefore, for example, a plurality of targets may be detected with respect to a single object. When an ignition of the own vehicle is turned ON, the millimeter-wave radar 21 repeatedly, at intervals, and continuously performs irradiation of the millimeter radio waves and reception of the reflected waves, and detection of the object, and the like.

The image sensor 22 is composed of an imaging camera that is provided with a focusing lens and a light receiving element and configured to obtain a captured image by capturing a front area of the own vehicle. When the ignition of the own vehicle is turned ON, the image sensor 22 repeatedly and continuously performs a process of acquiring the captured image. The yaw-rate sensor 23 detects a yaw rate of the own vehicle (rotational angular velocity). When the ignition of the own vehicle is turned ON, the yaw-rate sensor 23 repeatedly and continuously detects the yaw rate thereof. The steering angle sensor 24 detects a steering angle in steering of the own vehicle. When the ignition of the own vehicle is turned ON, the steering angle sensor 24 repeatedly and continuously detects the steering angle thereof. The vehicle speed sensor 25 detects a speed of the own vehicle. When the ignition of the own vehicle is turned ON, the vehicle speed sensor 25 repeatedly and continuously detects the speed of the own vehicle. The millimeter-wave radar 21 and the image sensor 22 described hereinabove correspond to a subordinate concept of the first sensor described in a column of a technical solution.

A2. Collision Avoidance Operation:

In the exemplary embodiment, a collision avoidance operation means performing an alert and actuating a brake. The alert is performs by outputting an alert sound from a speaker and by lighting a predetermined lamp in the instrument panel. Furthermore, an operation of vibrating a steering wheel may be performed so as to alert a driver as an alert function. Additionally, the predetermined lamp may be switched from "lighting" to "lights-out", and/or an operation of blinking the predetermined lamp may be performed.

Figure 2:
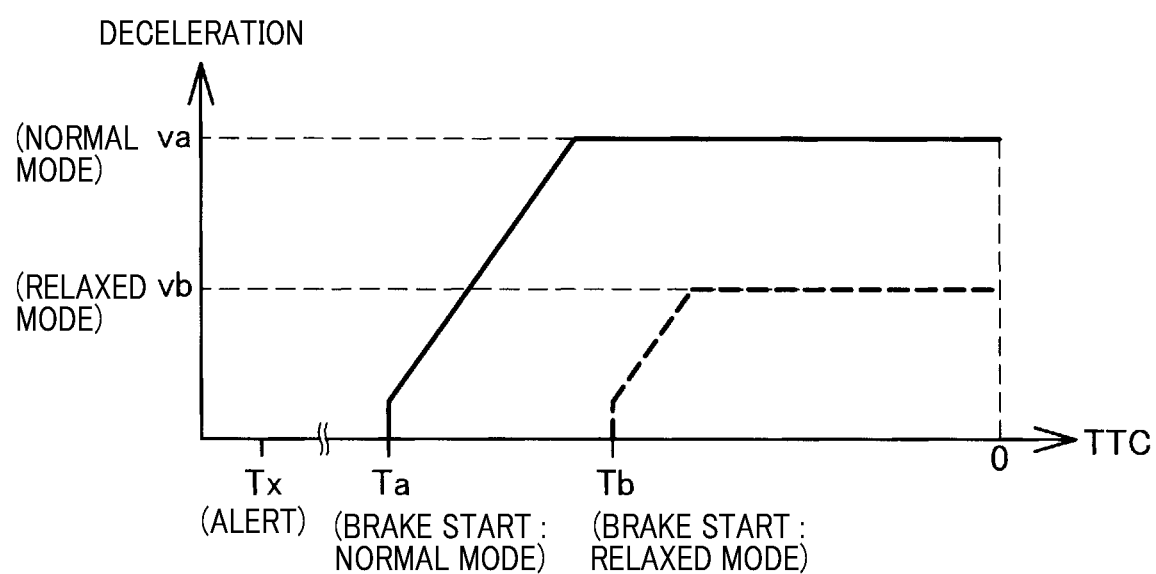
FIG. 2 is a graph schematically illustrating an execution timing of a collision avoidance operation and deceleration during the braking operation.

The operation of actuating the brake will be described with reference to FIG. 2. Referring to FIG. 2, a horizontal axis indicates a time until a collision occurs (TTC: Time-To-Collision) and a vertical axis indicates deceleration during the braking operation. A timing when the horizontal axis is "0" (zero) indicates a predicted collision time in FIG. 2.

As shown in FIG. 2, the alert is performed at a time Tx, after which the braking operating is performed. As described later, two braking modes are provided according to the exemplary embodiment: one mode in which the brake is relaxedly operated, that is to say, the brake operation is reduced or eased, (hereinafter referred to as a relaxed operation mode); and, in contrast, the other mode in which the brake is not relaxed, that is to say, the brake operation is not reduced, and is normally operated (hereinafter referred to as a normal operation mode). In FIG. 2, a thick solid line denotes a deceleration state of the own vehicle during the normal operation mode, and a thick broken line denotes a deceleration state of the own vehicle at the relaxed operation mode.

During the normal operation mode of the brake, the braking operation starts at a time Ta, and the own vehicle decelerates at a predetermined acceleration until the own vehicle reaches a predetermined deceleration va, after which when the own vehicle reaches the deceleration va, the deceleration va keeps continuing until the predicted collision time. Meanwhile, during the relaxed operation mode thereof, the braking operation starts at a time Tb which is shorter than the time Ta (closer to the predicted collision time), and the own vehicle decelerates at a predetermined acceleration until the own vehicle reaches a predetermined deceleration vb lower than the deceleration va, after which when the own vehicle reaches the deceleration vb, the deceleration vb keeps continuing until the predicted collision time. Accordingly, during the relaxed operation mode, a braking start timing is later (closer to the predicted collision time) and a final deceleration level is lower in comparison with the normal operation mode. Therefore, a brake distance is extended and the operation as the brake is relaxedly performed. In the exemplary embodiment, the time Tx during which the alert is performed is the same as the normal operation mode and the relaxed operation mode.

In a state where the moving object proceeding in the direction intersecting with the travelling direction of the own vehicle may exist, that is to say, where the own vehicle exists in the vicinity of the intersection or within the intersection, the vehicle collision avoidance support device 100 having the configuration described hereinabove is configured to perform a collision avoidance support process which will be described later, thereby making it advantageously possible to accurately detect the moving object.

Figure 3:
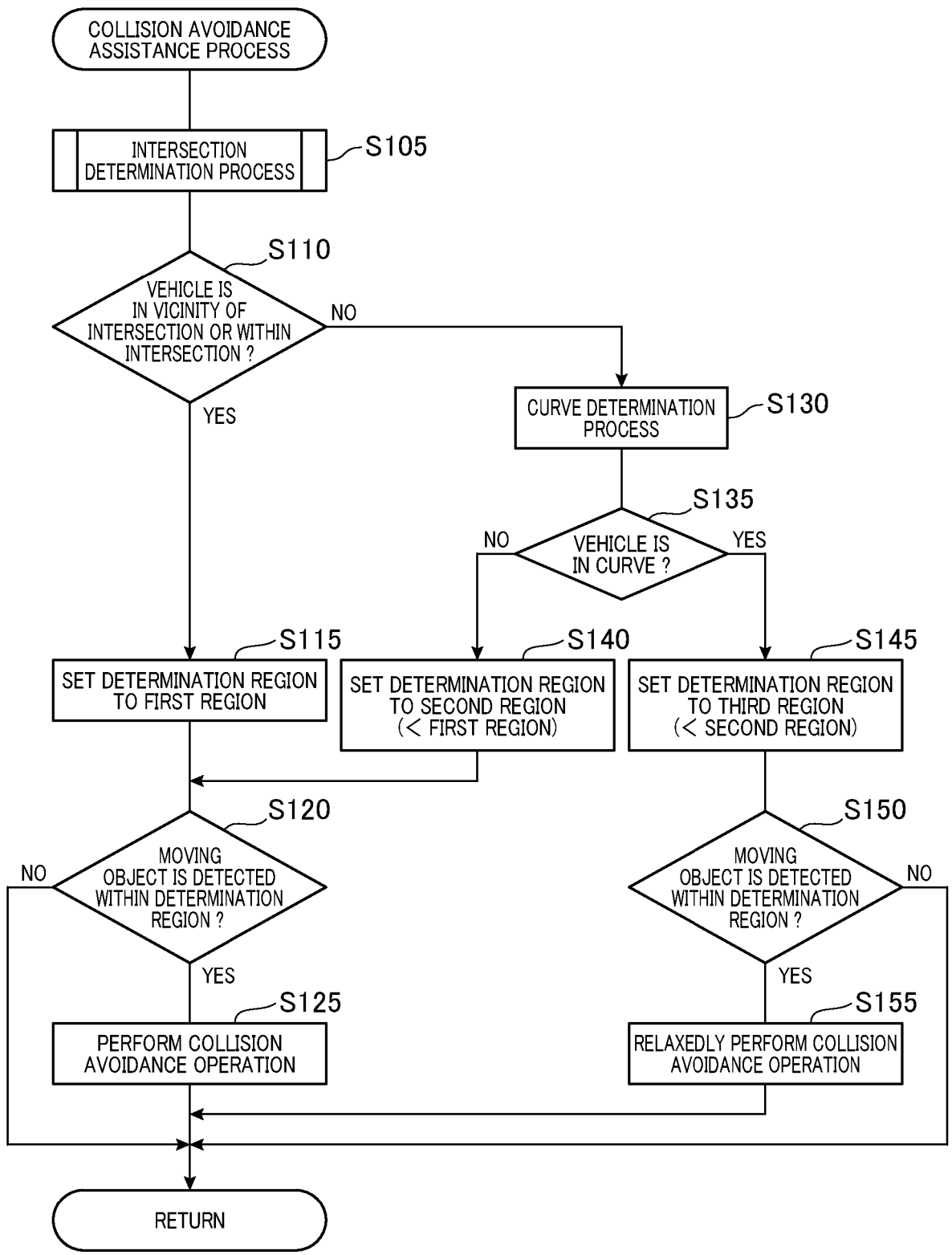
FIG. 3 is a flowchart illustrating procedures of a collision avoidance support process according to a first exemplary embodiment.

A3. Collision Avoidance Support Process:

The collision avoidance support process is a process of detecting an object in front of the own vehicle having a probability of colliding with the own vehicle, and of performing the collision avoidance operation when detecting the object. In the case of the vehicle collision avoidance support device 100, when the ignition of the own vehicle is turned ON, the collision avoidance support process is performed. As shown in FIG. 3, an intersection determination process is first performed by the state determination unit 11 in the collision avoidance support process at step S105.

Figure 4:
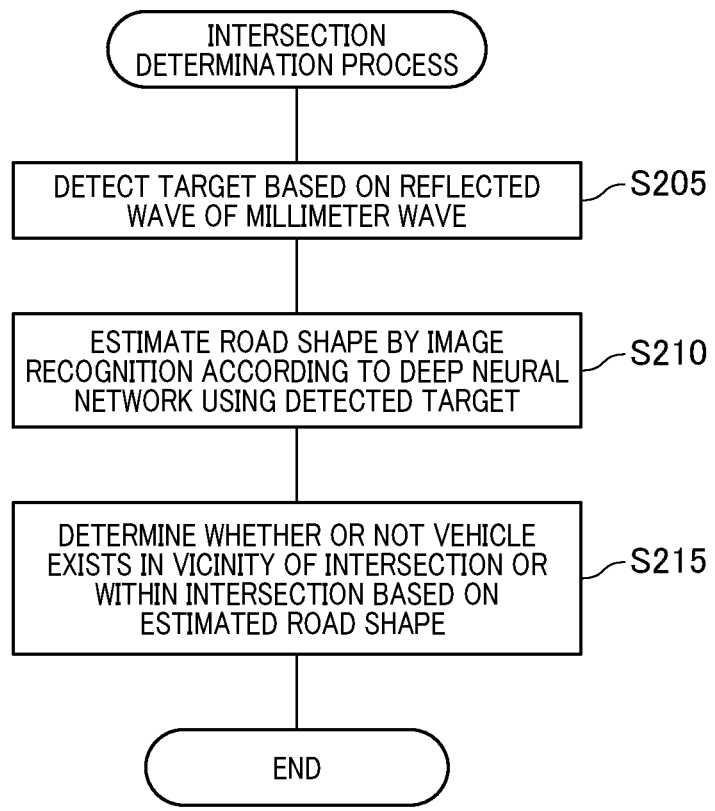
FIG. 4 is a flowchart illustrating procedures of an intersection determination process according to the first exemplary embodiment.

As shown in FIG. 4, as a first step, the millimeter-wave radar 21 detects a target based upon reflected waves of millimeter waves at step S205. The state determination part 11 predicts a road shape by using image recognition according to a deep neural network using the target detected by step S205 at step S210. For example, when the vehicle is travelling not at the intersection but on a straight road, a plurality of targets such as a target indicating a rear portion of a preceding vehicle, a target indicating a front portion of an oncoming vehicle, a target indicating a guard rail in a vicinity of the road, a target indicating a median strip, and the like are detected at step S205. Next, the preceding vehicle, the oncoming vehicle, the guard rail, the median strip, and the like are recognized by the image recognition according to the deep neural network using the targets, and the straight road is estimated as the road shape at step S210. For example, a plurality of targets such as a traffic light, a pedestrian crossing, a pedestrian overpass, a rear portion of the preceding vehicle, a side portion of a vehicle travelling on an intersecting road, and the like are detected in a vicinity of the intersection, and then a road shape in the vicinity of the intersection or within the intersection is estimated by the image recognition according to the deep neural network using the targets.

The state determination unit 11 determines whether or not the own vehicle exists in the vicinity of the intersection or within the intersection based upon the road shape estimated at step S210.

As shown in FIG. 3, according to the result of the intersection determination process at step S105, the state determination unit 11 determines whether or not the own vehicle exists in the vicinity of the intersection or within the intersection at step S110. When the own vehicle exists in the vicinity of the intersection or within the intersection at step S110 (YES), the avoidance operation control unit 12 is configured to set a region (hereinafter referred to as a determination region) where it is detected whether or not the object in front of the own vehicle exists as a first region at step S115. The first region will be hereinafter described with reference to FIG. 5.

Figure 5:
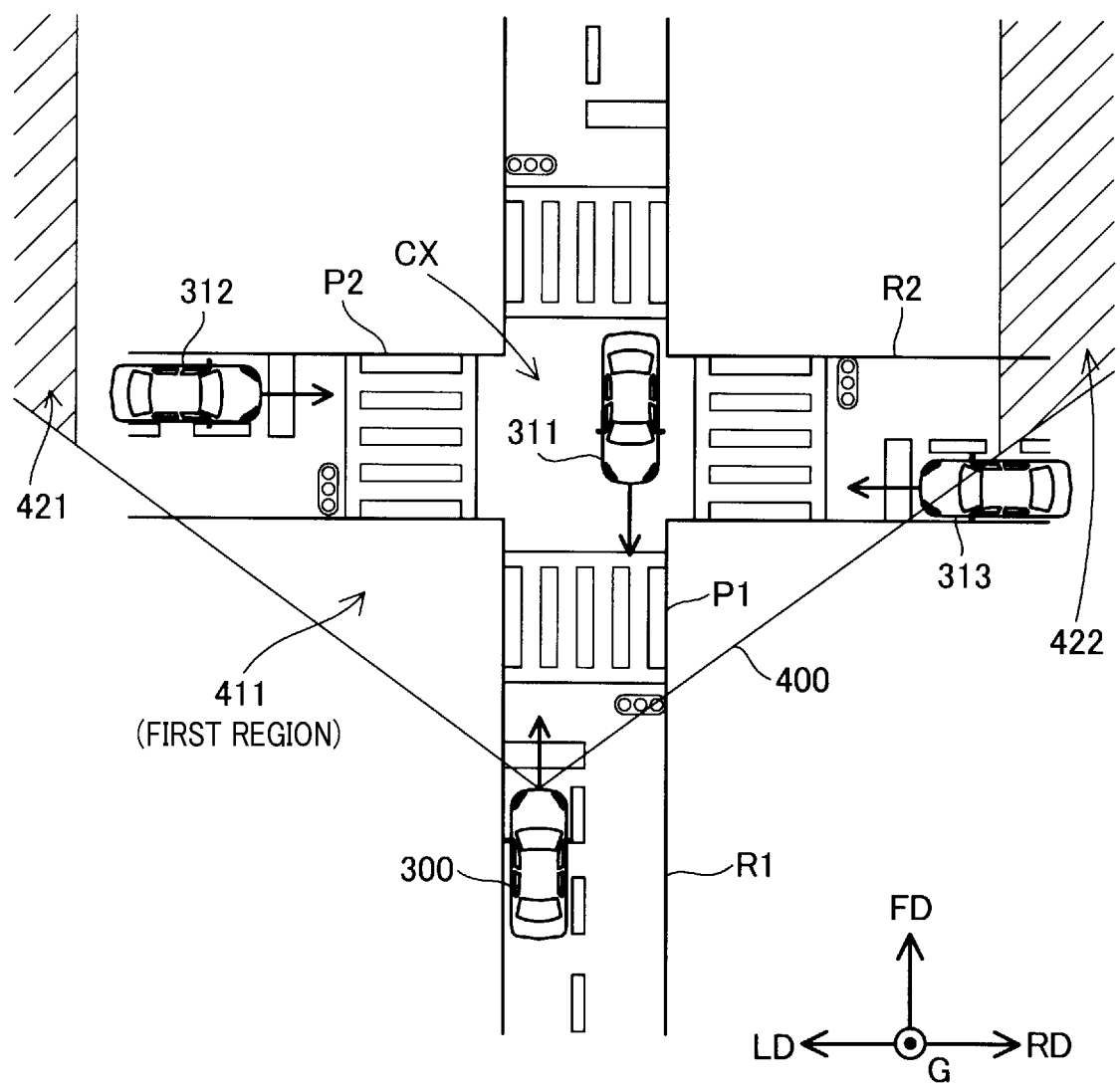
FIG. 5 is a schematic plan view illustrating a first region as a determination region.

Referring to FIG. 5, an own vehicle 300 is travelling in a vicinity of an intersection CX on a road R1, and is travelling into the intersection CX. An oncoming vehicle 311 is travelling within the intersection CX on an opposite lane of the road R1. Two vehicles 312 and 313 are stationary at a stop line in front of the intersection CX on a road R2 almost perpendicularly intersecting with the road R1 at the intersection CX. Additionally, the respective vehicles 300, 311, 312, and 313 are provided with respective arrows showing respective travelling directions thereof for convenience of explanation.

Referring to FIG. 5, a region 400 is a region in front of the own vehicle 300, and show a region receiving the reflected waves of the millimeter waves. Furthermore, since FIG. 5 is the image viewed from the sky, the region 411 is illustrated as a planar region, however, the region 411 is a region actually extending in a vertical direction G. In FIG. 5, the first region 411 is a central portion region in the region 400 where a non-target region 421 greater than a predetermined distance in a left direction LD from a central position of the own vehicle 300 and a non-target region 422 greater than a predetermined distance in a right direction RD from the central position of the own vehicle 300 are excluded.

As shown in FIG. 5, when the own vehicle 300 exists in the vicinity of the intersection, the first region 411 is set as the determination region. The first region 411 is wider in comparison with a second region and a third region. The region 411 includes an entire region of the intersection CX as well as a portion in the vicinity of the intersection CX on the road R2. And thus consequently, at least portions of two vehicles 312 and 313, all of which are stationary on the road R2, are included in the first region 411. In other words, as shown in FIG. 5, according to the exemplary embodiment, when the own vehicle 300 is travelling in the vicinity of the intersection or within the intersection, the first region 411 is set as a region, a size of which may include a vehicle or a pedestrian existing in the vicinity of the intersection on an intersecting road.

As shown in FIG. 3, the avoidance operation control unit 12 determines whether or not there exists the moving object proceeding in the direction intersecting with a travelling direction FD of the own vehicle 300 in the determination region and determines whether or not there exists a moving object having a probability of colliding with the own vehicle 300 step S120 in a manner of using a detection result of the millimeter-wave radar 21. When it is determined that the moving object is detected at step S120 (YES), the avoidance operation control unit 12 controls the brake mechanism 201 and the alert mechanism 202, thereby performing the collision avoidance operation at step S125. The collision avoidance operation at step S125 is performed as an operation of the normal operation mode. After the step S125 is completed, the process returns to the aforementioned step S105.

When it is determined that the own vehicle does not exist in the vicinity of the intersection or within the intersection at step S110 (NO), the curve determination unit 15 performs determination of whether or not the own vehicle is travelling in a curve (hereinafter referred to as a curve determination process) at step S130. In the case of the curve determination process, the curve determination unit 15 uses a yaw rate received from the yaw-rate sensor 23 and a steering angle received from the steering angle sensor 24, thereby identifying whether a yaw rate that is greater than a predetermined threshold value keeps continuing for a predetermined time, and whether a steering angle that is greater than a predetermined threshold value keeps continuing for a predetermined time. Furthermore, when the yaw rate that is greater than the predetermined threshold value keeps continuing for the predetermined time and the steering angle that is greater than the predetermined threshold value keeps continuing for the predetermined time, the curve determination unit 15 determines that the own vehicle is travelling in a curve. Meanwhile, when the yaw rate that is greater than the predetermined threshold value does not keep continuing for the predetermined time and the steering angle that is greater than the predetermined threshold value does not keep continuing for the predetermined time, the curve determination unit 15 determines that the own vehicle is not travelling in a curve.

According to the result of the curve determination process at step S130, the state determination unit 11 determines whether or not the own vehicle is travelling in the curve at step S135. When the own vehicle is not travelling in the curve at step S135 (NO), the avoidance operation control unit 12 is configured to set the determination region as a second region at step S140. In the case of step S140, the own vehicle does not exist in the vicinity of the intersection or within the intersection and is not travelling in the curve. Accordingly, in this case, a plurality of cases where the own vehicle is travelling on a straight road or is stationary, and the own vehicle is travelling in a parking lot or is stationary therein, and the like may be generally predicted. The second region will be hereinafter described with reference to FIG. 6.

Figure 6:
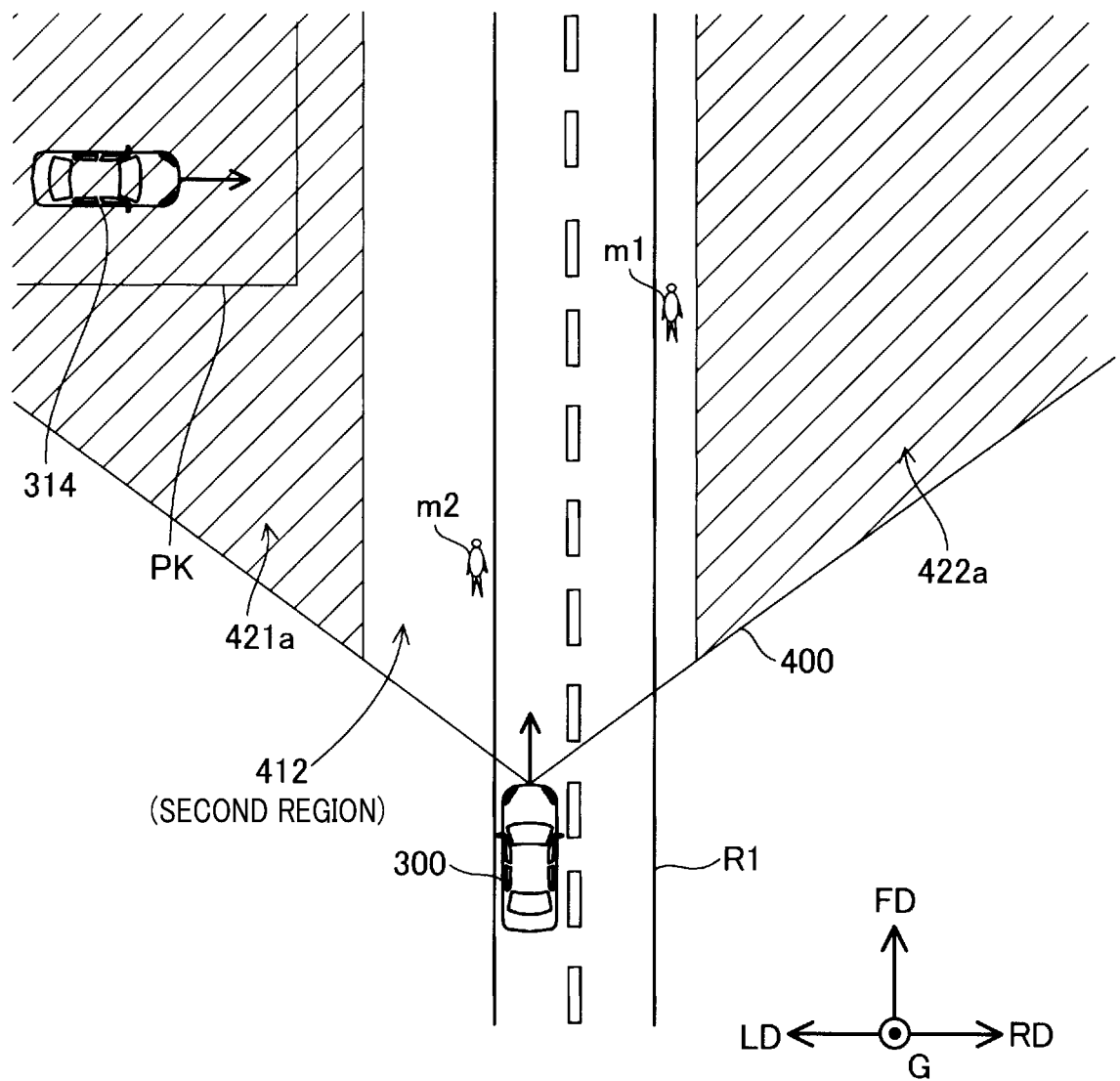
FIG. 6 is a schematic plan view illustrating a second region as the determination region.

As shown in FIG. 6, the own vehicle 300 is travelling on a portion of a straight shape on the road R1. An oncoming vehicle does not exist on the opposite lane of the road R1. Meanwhile, a pedestrian m1 and a pedestrian m2 are walking on a sidewalk (not shown) in a vicinity of the road R1. Furthermore, a vehicle 314 is moving in a right direction RD in a parking lot PK positioned in a left direction LD of the road R1. A region 400 in FIG. 6 shows a region receiving the reflected waves of the millimeter waves, which is the same as the region 400 in FIG. 5.

In an example of FIG. 6, a second region 412 is a central portion region where a non-target region 421*a* greater than a predetermined distance in the left direction LD from the central position of the own vehicle 300, and a non-target region 422*a* greater than a predetermined distance in the right direction RD from the central position of the own vehicle 300 are excluded in the region 400. However, the non-target region 421*a* in FIG. 6 is wider than the non-target area 421 in FIG. 5 so as to understand a difference therebetween. Additionally, the non-target region 422*a* in FIG. 6 is also wider than the non-target region 422 in FIG. 5. Therefore, the second region 412 shown in FIG. 6 is narrower than the first region 411 shown in FIG. 5. For example, a width with respect to the second region 412 (hereinafter referred to as a width) in a direction perpendicular and horizontal to the travelling direction FD may be set to one-third of the width of the first region 411. The width is not limited to one-third thereof, and may be set to an arbitrary ratio lower than 1. In the exemplary embodiment, as shown in FIG. 6, when the own vehicle 300 travels in the straight road, the second region 412 is set as a region, a size of which includes the pedestrian m2 on a sidewalk in a vicinity of the own vehicle's travelling lane and the pedestrian m1 on a sidewalk in a vicinity of an opposite lane in a determination range.

As shown in FIG. 3, the aforementioned steps S120 and S125 are performed after completing the aforementioned step S140. Therefore, when one of the pedestrians m1 and m2 shown in FIG. 6 is about to cross the road R1 and thus a probability of colliding with the own vehicle 300 is predicted, the avoidance operation is configured to be performed. Since the vehicle 314 travelling in the parking lot PK does not exist in the second region 412, the vehicle 314 is not detected as a moving object having the collision probability. Since the vehicle 314 is travelling in the parking lot PK, for example, even though the vehicle 314 is travelling in a direction of the road R1, the collision probability is low. Thus, it is advantageously possible not only to avoid erroneously detecting the vehicle 314 as the moving object having the collision probability, but also to avoid performing the unnecessary collision avoidance operation. Accordingly, for example, it is advantageously possible to avoid a collision with a vehicle (not shown) which may occur when the vehicle 300 performs the brake operation at a position shown in FIG. 6 due to the existence of the vehicle 314.

At the aforementioned step S135, when it is determined that the own vehicle is travelling in the curve at step S135 (YES), as shown in FIG. 3, the avoidance operation control unit 12 is configured to set the determination region as a third region at step S145. In the case of step S145, the own vehicle is not travelling in the vicinity of the intersection or within the intersection but travelling in the curve. The third region will be hereinafter described with reference to FIG. 7.

Figure 7:
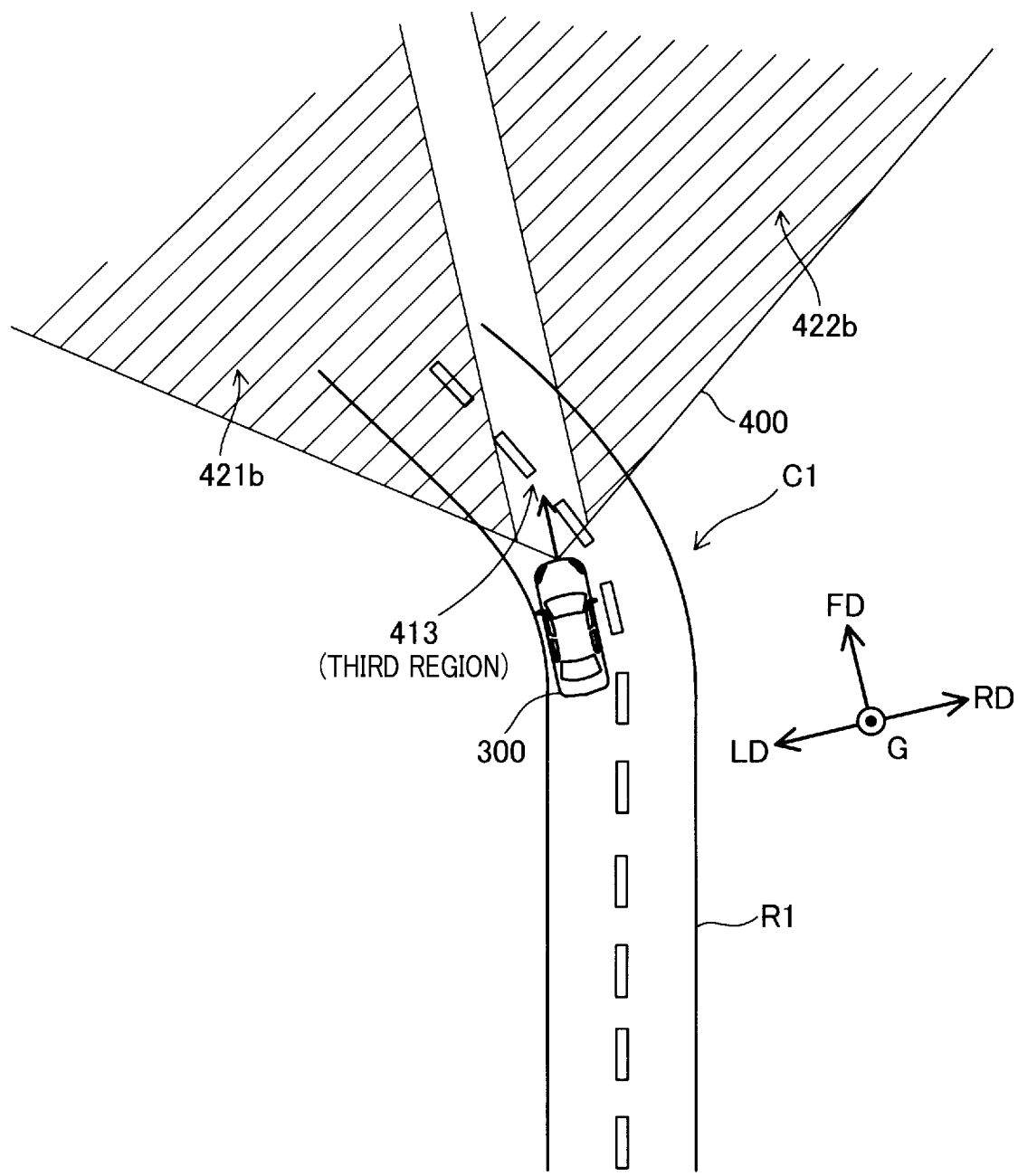
FIG. 7 is a schematic plan view illustrating a third region as the determination region.

Referring to FIG. 7, the own vehicle 300 is travelling in a curve C1 on a road R1. Furthermore, in the case of an example in FIG. 7, any one of the preceding vehicle, the oncoming vehicle, and the pedestrian 3 does not exist. A region 400 in FIG. 7 shows a region receiving the reflected waves of the millimeter waves, which is the same as the region 400 in FIGS. 5 and 6.

In an example of FIG. 7, a third region 413 is a central portion region where a non-target region 421b greater than a predetermined distance in the left direction LD from the central position of the own vehicle 300, and a non-target region 422b greater than a predetermined distance in the right direction RD from the central position of the own vehicle 300 are excluded in a region 400. However, the non-target region 421b in FIG. 7 is wider than the non-target region 421a in FIG. 6 so as to understand a difference therebetween. Additionally, the non-target region 422b in FIG. 7 is also wider than the non-target region 422a in FIG. 6. Therefore, the third region 413 shown in FIG. 7 is narrower than the first region 411 shown in FIG. 5 and the second region 412 in FIG. 6. In the exemplary embodiment, a width of the third region 413 is almost coincident with a width of a travelling lane of the own vehicle. Thus, the third region 413 is set as a lowest limit range in which a rear portion of the preceding vehicle is able be detected. Additionally, the width of the third region 413 may be set to one-third of the second region 412. Furthermore, the width is not limited to one-third thereof, and may be set to an arbitrary ratio lower than 1.

Since the object having the collision probability is easy to be erroneously detected while travelling in the curve, the third region 413 having a very narrow region is set as the determination region while travelling in the curve, such that the determination region is set as the narrow region so as to suppress the error detection. Furthermore, since the travelling direction of the own vehicle is changed at every moment while travelling in the curve, a collision probability between the own vehicle and the oncoming vehicle, etc. may be highly erroneously detected. When the collision avoidance operation is performed due to the error detection with respect to the collision probability, for example, an unnecessary braking operation is performed in the curve, thereby having a high probability of colliding with a following vehicle. Therefore, as described hereinabove, the third region 413 having the very narrow region is set as the determination region, thereby not only suppressing the unnecessary braking operation, but also suppressing the probability of colliding with the following vehicle.

As shown in FIG. 3, after completing the aforementioned step S145, the avoidance operation control unit 12 determines whether or not the moving object having the probability of colliding with the own vehicle is detected at step S150. Since the step S150 has the same process as that of the step S120, detailed descriptions with respect to the procedures of the process will be omitted.

When it is determined that the moving object having the probability of colliding with the own vehicle is detected at step S150 (YES), the avoidance operation control unit 12 performs the collision avoidance operation by controlling the brake mechanism 201 and the alert mechanism 202 at step S155. The collision avoidance operation at step S155 is performed as an operation of the relaxed operation mode. Therefore, the braking start timing is later in comparison with the normal operation mode, such that the final deceleration level becomes lower. Accordingly, as described hereinabove, since it may increase the possibility of erroneously detecting the object having the collision probability while travelling in the curve to perform the collision avoidance operation as the relaxed operation mode in a case where the moving object is detected while travelling in the curve, the braking start timing is configured to be delayed, or the deceleration is configured to be reduced, thereby making it advantageously possible to suppress the collision between the own vehicle and the following vehicle.

After completing step S155, or when it is determined that the moving object having the probability of colliding with the own vehicle is not detected at step S150 (NO), the process returns to the aforementioned step S105.

According to the vehicle collision avoidance support device 100 of the first exemplary embodiment, the region (the first region 411) that is wider in the direction perpendicular and horizontal to the travelling direction FD is used as the determination region when it is determined that there is a state where the own vehicle exists in the vicinity of the intersection or within the intersection in comparison with when it is determined that there is no state where the own vehicle exists in the vicinity of the intersection or within the intersection, thereby accurately detecting the moving object travelling in the direction intersecting with the travelling direction of the own vehicle and having the high collision probability. Furthermore, the region (the second region 412 or third region 413) that is narrower in the direction perpendicular and the horizontal to the travelling direction FD is used as the determination region when it is determined that there is no state where the own vehicle exists in the vicinity of the intersection or within the intersection in comparison with when it is determined that there is the state where the own vehicle exists in the vicinity of the intersection or within the intersection, thereby making it advantageously possible to suppress the error detection of the moving object travelling in the direction intersecting with the travelling direction of the own vehicle and having the high collision probability. As a result, it is advantageously possible to accurately detect the moving object proceeding in the direction intersecting with the travelling direction of the own vehicle.

Additionally, it is determined whether or not there is the state where the own vehicle exists in the vicinity of the intersection or within the intersection in a manner of using the image recognition according to the deep neural network using information, that is to say a target, acquired by the millimeter-wave radar 21, thereby performing an accurate determination.

Furthermore, the collision avoidance operation is relaxedly performed when it is determined that the own vehicle is travelling in the curve in comparison with when it is determined that the own vehicle is not travelling in the curve, thereby making it advantageously possible to suppress a problem in which the collision avoidance operation is performed in a case where the moving object travelling in the direction intersecting with the travelling direction of the own vehicle and having the high collision probability is erroneously detected, and, for example, to suppress a problem in which the collision between the own vehicle and the following vehicle may occur due to the unnecessary braking operation, and the like while the own vehicle is travelling in the curve where normally the moving object is easy to be erroneously detected.

Furthermore, the braking start timing is configured to be delayed and the deceleration is configured to be reduced when it is determined that the own vehicle is travelling in the curve in comparison with when it is determined that the own vehicle is not travelling in the curve, thereby not only acquiring a spare time for detecting whether or not there exists the moving object travelling in the direction intersecting with the travelling direction of the own vehicle and having the high collision probability, but also reducing the collision between the own vehicle and the following vehicle due to the unnecessary braking operation by reducing the deceleration.

B. Second Exemplary Embodiment

A vehicle collision avoidance support device according to a second exemplary embodiment is different from the vehicle collision avoidance support device 100 according to the first exemplary embodiment with respect to the detailed procedures of the intersection determination process in the collision avoidance support process at step S105. In contrast, a device configuration thereof and other procedures of the collision avoidance support process thereof are the same as those of the vehicle collision avoidance support device 100 according to the first exemplary embodiment. Additionally, a flowchart shown in FIG. 9 is performed after a flowchart shown in FIG. 8 is performed.

Figure 8:
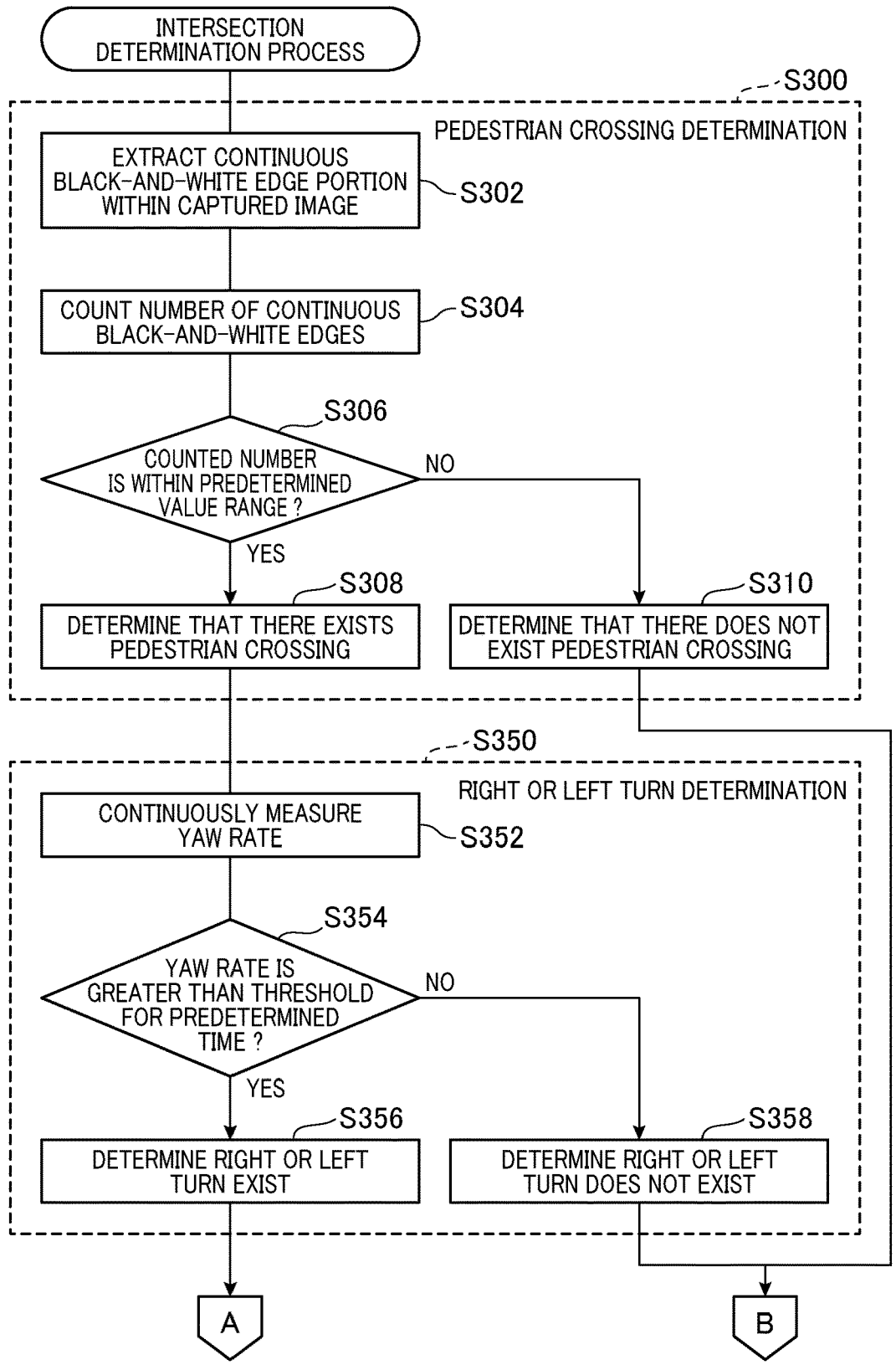
FIG. 8 is a flowchart illustrating procedures of an intersection determination process according to a second exemplary embodiment.
Figure 9:
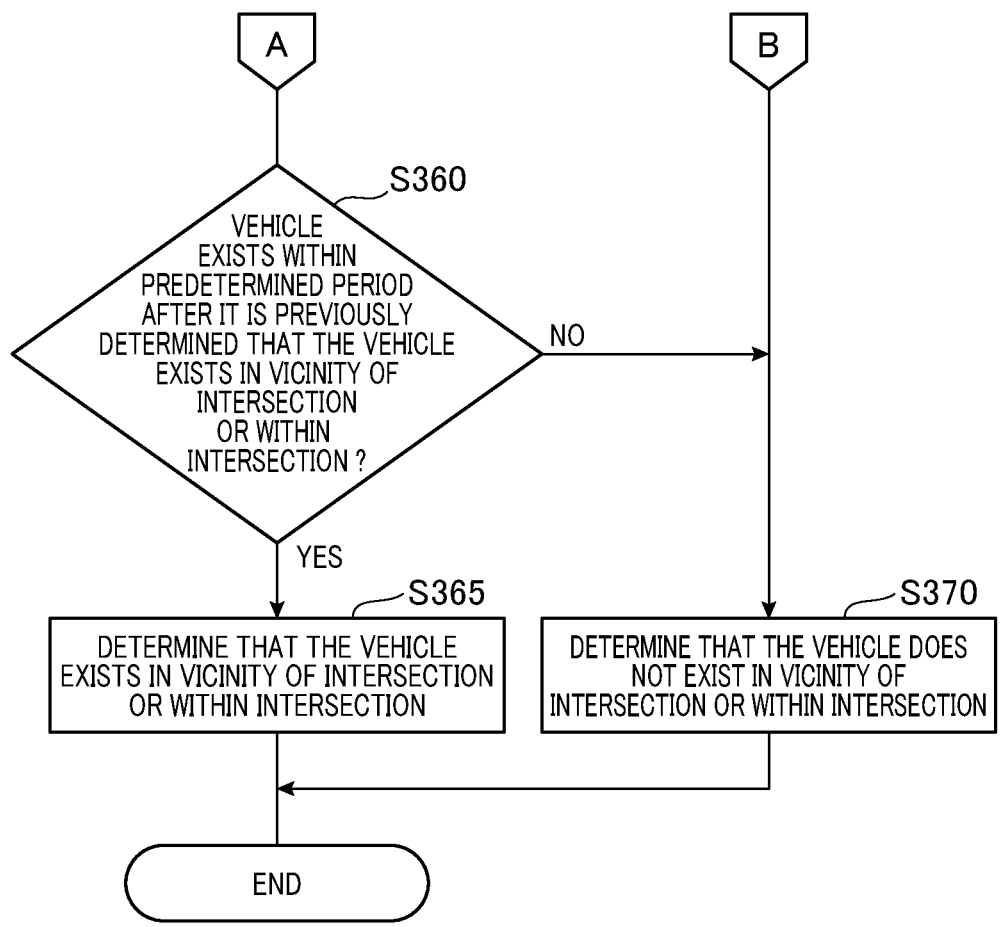
FIG. 9 is a flowchart illustrating the procedures of the intersection determination process according to the second exemplary embodiment.

As shown in FIGS. 8 and 9, the intersection determination process according to the second exemplary embodiment determines whether or not the own vehicle exists in the vicinity of the intersection or within the intersection based upon pedestrian crossing determination at step S300 and a result of a right or left turn determination at step S350, a process of which is performed after the step S300.

With respect to the pedestrian crossing determination at step S300, the state determination unit 11 extracts a portion (hereinafter referred to as a continuous black-and-white edge portion) in which an edge portion (a boundary portion) between a white color and a black color continues at a predetermined interval in a captured image acquired by the image sensor 22 at step S302. The state determination unit 11 counts a number of edges in the continuous black-and-white edge portion at step S304. The state determination unit 11 determines whether or not the number of edges counted at step S304 is within a predetermined numerical range at step S306. The predetermined numerical range at step S306 is a numerical range that is previously determined based upon a number of edges of a general pedestrian crossing.

Next, when it is determined that the number of edges in the continuous black-and-white edge portion exists within the predetermined numerical range at step S306 (YES), the state determination unit 11 determines that the pedestrian crossing exists at step 308, and performs the right or left turn determination at step S350. At the right or left turn determination step S350, as a first step, the state determination unit 11 continuously measures the yaw rate received from the yaw-rate sensor 23 only for a predetermined time at step 352. The state determination part 11 determines whether or not the yaw rate is in a state of being equal to or greater than a threshold only for the predetermined time (step S354). When it is determined that the yaw rate is in the state of being equal to or greater than the threshold only for the predetermined time at step S354 (YES), the state determination unit 11 determines that a right turn or a left turn exists (that is to say, a right turn or a left turn is performed) at step S356, after which, as shown in FIG. 9, it is determined whether or not the own vehicle is within a predetermined period after it is previously determined that the own vehicle exists in the vicinity of the intersection or within the intersection at step S360. The predetermined period at step S360 is previously set as the predetermined period from when the vehicle enters the intersection until the vehicle exits from the intersection after turning right or left. For example, the predetermined period may be set to 10 seconds. Alternatively, the predetermined period may be set to an arbitrary time which is shorter than 10 seconds or longer than 10 seconds.

When the own vehicle is determined to be within the predetermined period after it is previously determined that the own vehicle exists in the vicinity of the intersection or within the intersection at step S360 (YES), the state determination unit 11 determines that the own vehicle exists in the vicinity of the intersection or within the intersection at step S365. As described hereinabove, when it is determined that the pedestrian crossing exists at step S308, and, after which when it is determined that the right turn or left turn exists at step S356, there exists a high possibility that the own vehicle enters the intersection and turns right or left. In consideration of the state described hereinabove, when the own vehicle is determined to be within the predetermined period after it is previously determined that the own vehicle exists in the vicinity of the intersection or within the intersection, that is to say, when the own vehicle is determined to be within the predetermined period from when the own vehicle enters the intersection until the vehicle own exits from the intersection after turning right or left, there exists a high possibility that the own vehicle is in a process of turning right or left and does not exit from the intersection. Therefore, in this case, it is determined that the own vehicle exists in the vicinity of the intersection or within the intersection.

On the other hand, when the own vehicle is not determined to be within the predetermined period after it is previously determined that the own vehicle exists in the vicinity of the intersection or within the intersection at step S360 (NO), the state determination unit 11 determines that the own vehicle does not exist in the vicinity of the intersection or within the intersection at step S370. In consideration of the state described hereinabove, when the own vehicle is not determined to be within the predetermined period after it is previously determined that the own vehicle exists in the vicinity of the intersection or within the intersection, that is to say, when the predetermined elapsed, there exists a high possibility that the own vehicle already exited from the intersection and is far away from the intersection. Therefore, in this case, it is determined that the own vehicle does not exist in the vicinity of the intersection or within the intersection.

Furthermore, in the case of the aforementioned step S306, when it is determined that the counted number of edges is not within the predetermined numerical range at step S306 (NO), the state determination unit 11 determines that the pedestrian crossing does not exist at step S310, after which the aforementioned step S370 is performed. Therefore, in this case, it is determined that the own vehicle does not exist in the vicinity of the intersection or within the intersection. Additionally, in the case of the aforementioned step S354, when it is determined that the yaw rate is not in the state of being equal to or greater than the threshold only for the predetermined time at step S354 (NO), the state determination unit 11 determines that the right turn or left turn does not exist (that is to say, the right turn or left turn is not performed by the own vehicle) at step S358, after which the aforementioned step S370 is performed. Therefore, in this case, it is determined that the own vehicle does not exist in the vicinity of the intersection or within the intersection.

The vehicle collision avoidance support device according to the second exemplary embodiment described hereinabove has the same effect as the vehicle collision avoidance support device 100 according to the first exemplary embodiment. Additionally, when it is determined that the own vehicle is in the process of turning right or left after the pedestrian crossing is determined to exist, and when the own vehicle is determined to be within the predetermined period after it is previously determined that the own vehicle exists in the vicinity of the intersection or within the intersection, It is determined that the own vehicle exists in the vicinity of the intersection or within the intersection, thereby making it advantageously possible to accurately determine whether or not the own vehicle exists in the vicinity of the intersection or within the intersection.

C. Third Exemplary Embodiment

Figure 10:
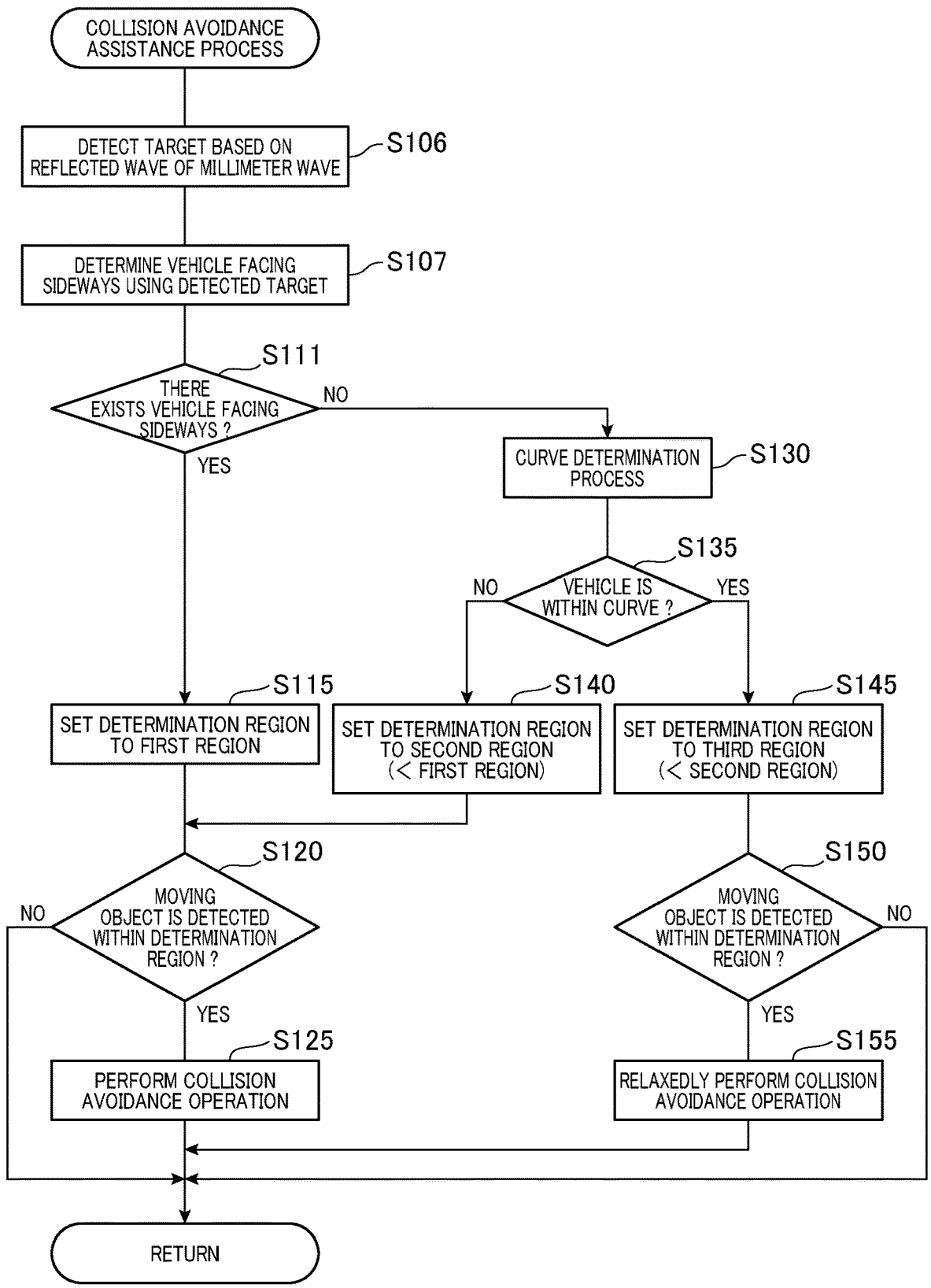
FIG. 10 is a flowchart illustrating procedures of a collision avoidance support process according to a third exemplary embodiment.

A vehicle collision avoidance support device according to a third exemplary embodiment is different from the vehicle collision avoidance support device 100 according to the first exemplary embodiment with respect to the detailed procedures of the intersection determination. In contrast, a configuration thereof is the same as that of the vehicle collision avoidance support device 100 according to the first exemplary embodiment. As shown in FIG. 10, the procedures of the collision avoidance support process according to the third exemplary embodiment are different from the those of the collision avoidance support process according to the first exemplary embodiment in FIG. 3 in that steps S106 and S107 are performed instead of the step S105, and a step S111 is performed instead of the step S110. Other procedures of the collision avoidance support process according to the third exemplary embodiment are the same as those of the vehicle collision avoidance support process according to the first exemplary embodiment, such that the same reference numerals are provided to the same procedures and detailed descriptions thereof will be omitted.

As shown in FIG. 10, when the collision avoidance support process according to the third exemplary embodiment starts, first, the millimeter-wave radar 21 detects a target based upon the reflected waves of the millimeter waves at step S106. The step S106 is the same as the step S205 of the intersection determination process shown in FIG. 4. At step S107, the state determination unit 11 determines whether or not a vehicle facing sideways exists by using the target detected at step S106.

Figure 11:
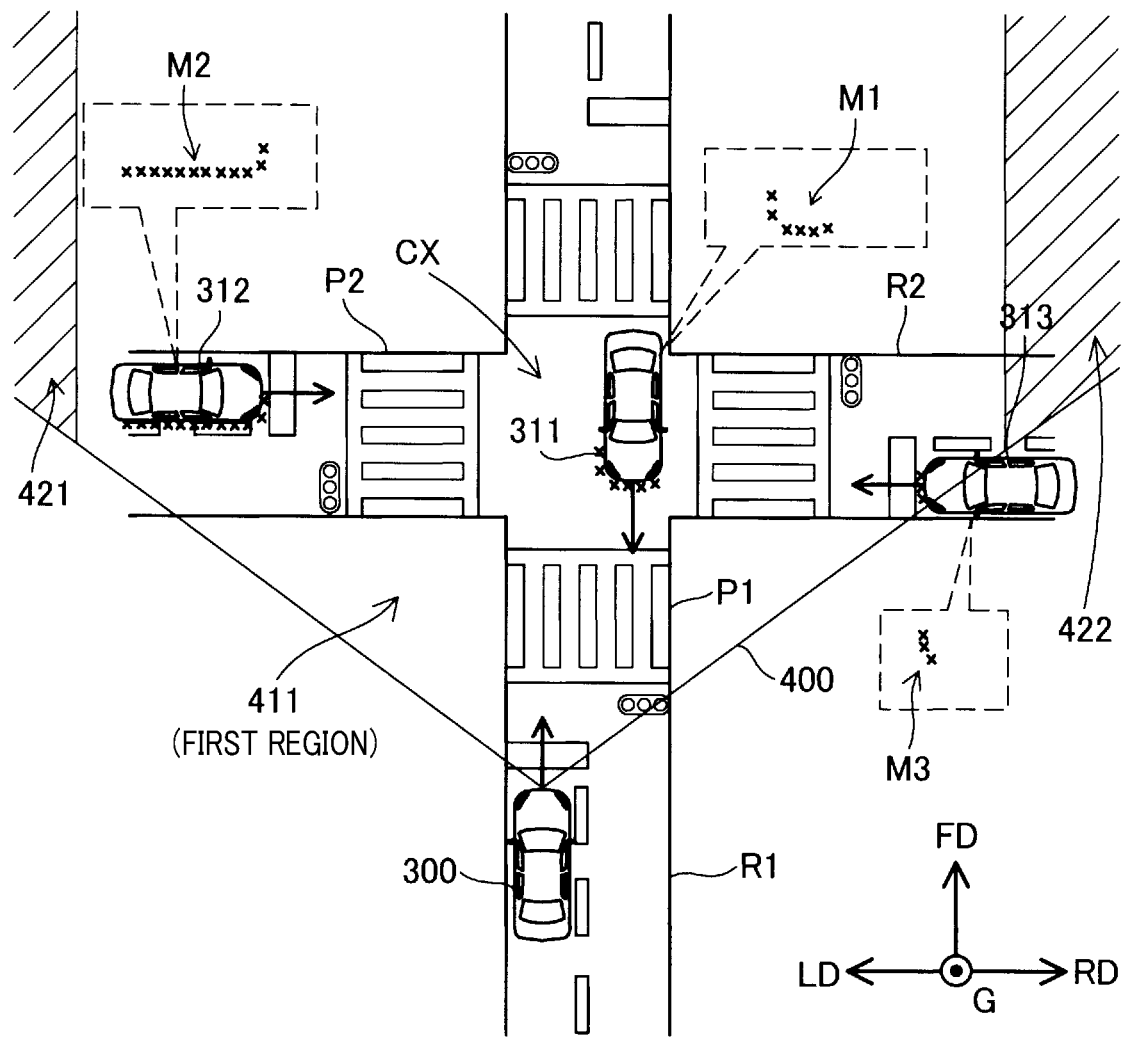
FIG. 11 is a schematic plan view illustrating a detection method of a vehicle facing sideways according to the third exemplary embodiment.

As shown in FIG. 11, a plurality of targets are detected in respective vehicles 311, 312, and 313 by the reflected waves from the respective vehicles 311, 312, and 313 except the own vehicle 300. Furthermore, in FIG. 11, each target is indicated by an X mark. Models composed of respective target groups are respectively specified for the respective vehicles in consideration of positions of the targets detected from the respective vehicles. In other words, a model M1 is specified for the vehicle 311. Additionally, a model M2 is specified for the vehicle 312, and a model M3 is specified for the vehicle 313. In comparison with three models M1 to M3, particularly, the model M2 of the vehicle 312 among from the models of vehicles facing sideways (that is to say, the models M2 and M3) has a shape that is obviously different from the model of the vehicle facing longitudinally (that is to say, the model M1). Therefore, the state determination unit 11 is able to detect a vehicle facing sideways by using a shape difference therebetween As shown in FIG. 10, the state determination unit 11 determines whether or not the vehicle facing sideways exists or not according to a determination result at step S107. When it is determined that the vehicle facing sideways exists at step S111 (YES), the aforementioned steps S115 to S125 are performed. Thus, in this case, the determination region is set to the first region 411. Accordingly, when it is determined that the vehicle facing sideways does not exist at step S111 (NO), the aforementioned steps S130 to S155 are performed. Therefore, in this case, the determination region is set to the second region 412 or the third region 413.

In the exemplary embodiment, when the vehicle facing sideways exists, the determination region is set to the first region. Accordingly, for example, even in a case where, while the own vehicle is travelling in a parking lot, there exists another vehicle travelling in the direction intersecting with the travelling direction of the own vehicle in the same parking lot, the determination region may be set to the relatively wide first region as well as the case where the own vehicle exists in the vicinity of the intersection or within the intersection. Therefore, in the case where, while the own vehicle is travelling in a parking lot, there exists another vehicle travelling in the direction intersecting with the travelling direction of the own vehicle and having the high collision possibility in the same parking lot, it is advantageously possible to accurately detect the moving object having the high collision probability.

The vehicle collision avoidance support device according to the third exemplary embodiment may obtain the same effects as those of the vehicle collision avoidance support device 100 according to the first exemplary embodiment. Furthermore, even in the case where the own vehicle does not exist in the vicinity of the intersection or within the intersection, when there exists another vehicle proceeding in the direction intersecting with the travelling direction of the own vehicle, or a vehicle having a possibility of proceeding in the above-mentioned direction, the determination region may be set to the first region. Additionally, in order to understand the collision avoidance support process described hereinabove in the third exemplary embodiment, the state where there may exist the moving object proceeding in the direction intersecting with the travelling direction of the own vehicle means the state where there exists the vehicle facing sideways in front of the own vehicle.

D. Modifications

D1. Modified Example 1

The collision avoidance operation is configured to perform the alert and put on the brake in the respective exemplary embodiments described hereinabove, however, the present disclosure is not limited thereto. Either one of performing the alert and actuating the brake may be applied as well. Also, another operation as well as either one of or both of performing the alert and actuating the brake may be performed for the collision avoidance operation. For example, the collision avoidance operation may include one or a plurality of the following operations of:

(a) automatically closing a throttle valve of the own vehicle;

(b) increasing assist oil pressure of the brake to improve response characteristics of the brake with respect to an operation of a brake pedal;

(c) steering automatically so as to change the travelling direction of the own vehicle to a direction avoiding a collision with the moving object; and (d) automatically tightening a seat belt to suppress a movement of a vehicle occupant during the collision.

D2. Modified Example 2

According to the second exemplary embodiment, when it is determined that the own vehicle is in the process of turning right or left after the pedestrian crossing is determined to exist, and when the own vehicle is determined to be within the predetermined period after it is previously determined that the own vehicle exists in the vicinity of the intersection or within the intersection, it is determined that the own vehicle exists in the vicinity of the intersection or within the intersection. However, the present disclosure is not limited thereto. When it is determined that the own vehicle is in the process of turning right or left after the pedestrian crossing is determined to exist, it may be determined that the own vehicle exists in the vicinity of the intersection or within the intersection regardless of the state where the own vehicle is determined to be within the predetermined period after it is previously determined that the own vehicle exists in the vicinity of the intersection or within the intersection. When it is determined that the own vehicle is in the process of turning right or left after the pedestrian crossing is determined to exist, there exist a high possibility that the own vehicle does not exit from the intersection yet, such that it is advantageously possible to accurately determine whether or not the own vehicle exists in the vicinity of the intersection or within the intersection even in this configuration.

D3. Modified Example 3

In the first and second exemplary embodiments, after being set to the first region 411, the determination region may be changed to be set to the second region 412 or the third region 413 in the case where it is determined that the own vehicle does not exist in the vicinity of the intersection or within the intersection at step S110, or in the case where the own vehicle is travelling in the curve at step S135. However, the present disclosure is not limited thereto. A process of changing a setting for the determination region (that is to say, a process of returning to an original setting) may be performed based upon a process that is different from the determination processes at steps S110 and S135. For example, when the predetermined period elapsed after it is previously determined that the own vehicle exists in the vicinity of the intersection or within the vicinity of the intersection, a process of setting the determination region back to a region before being changed into the first region (for example, the second region 412) may be performed.

Furthermore, for example, according to the second exemplary embodiment, when the pedestrian crossing is detected again within the predetermined period after it is determined that the own vehicle exists in the vicinity of the intersection or within the intersection, the process of setting the determination region back to the region before being changed into the first region (for example, the second region 412) may be performed. With respect to the detailed operations of the aforementioned configuration, an example will be described with reference to a case where the own vehicle 300 is travelling at the position shown in FIG. 5, after which the own vehicle 300 turns left at the intersection CX. At the position shown in FIG. 5, the own vehicle detects the pedestrian crossing P1 existing in front of the own vehicle and then the pedestrian crossing is determined to exist at step S308 in FIG. 8, after which the own vehicle 300 turns left, such that it is determined that the right turn or left turn exists at step S356. Furthermore, when the own vehicle is determined to be within the predetermined period after it is previously determined that the own vehicle exists in the vicinity of the intersection or within the intersection, it is determined that the own vehicle exists in the vicinity of the intersection or within the intersection at step S365 in FIG. 9, and the determination region is set to the first region 411. In this case, as shown in FIG. 5, while turning left at the intersection CX, the pedestrian crossing P2 on the road R2 exists in front of the own vehicle, such that the pedestrian crossing is detected. The own vehicle 300 exits from the intersection CX immediately after detecting the pedestrian crossing P2, and travels on a portion of the straight road R2. Accordingly, in consideration of the state where the pedestrian crossing P2 is detected after it is determined that the right turn or left turn exists, the determination region may be set back to the second region 412 from the first region 411. Accordingly, the determination region may be immediately changed from the first region 411 to the second region 412, thereby more accurately suppressing the error detection of the moving object travelling in the direction intersecting with the travelling direction of the own vehicle and having the high collision probability.

D4. Modified Example 4

The intersection determination at step S105 according to the first and second exemplary embodiments, and the determination of whether or not the vehicle facing sideways exists at steps S106, S107, and S111 according to the third exemplary embodiment may be bi-directionally performed. In this case, for example, when it is determined that the own vehicle exists in the vicinity of the intersection or within the intersection, and when it is determined that the vehicle facing sideways exists, the determination region may be set to the first region 411. According to the configuration described hereinabove, only when there exists a high possibility of including another vehicle travelling in the direction intersecting with the travelling direction of the own vehicle and having the high collision probability, the determination region may be configured to be wider, thereby making it advantageously possible to suppress the error detection. Additionally, for example, the determination region may be set to the first region 411 when it is determined that the own vehicle exists in the vicinity of the intersection or within the intersection, or when the vehicle facing sideways exists. Furthermore, a size of the determination region may be adjusted depending on a high or low possibility of including another vehicle having the high probability of colliding with the own vehicle. More specifically, the determination region may be configured to be three times wider than the second region 412 when it is determined that the own vehicle exists in the vicinity of the intersection or within the intersection, and also when it is determined that the vehicle facing sideways exists. Meanwhile, the determination region may be configured to be two and half times wider than the second region 412 when it is determined that the own vehicle exists in the vicinity of the intersection or within the intersection, or when it is determined that the vehicle facing sideways exists.

D5. Modified Example 5

The intersection determination process is not limited to the process of the first exemplary embodiment shown in FIG. 4, and the process of the second exemplary embodiment shown in FIGS. 8 and 9. For example, the navigation device may check out whether or not a current position of the own vehicle exists in the vicinity of the intersection or within the intersection, based on which the intersection determination process may be performed. Furthermore, for example, when the yaw rate that is greater than the predetermined threshold value keeps continuing for the predetermined time, and also when the steering angle that is greater than the predetermined threshold value keeps continuing for the predetermined time, it may be determined that the own vehicle exists within the intersection

D6. Modified Example 6

According to the first and second exemplary embodiments, when it is determined that the own vehicle exists in the vicinity of the intersection or within the intersection in consideration of the result of the pedestrian crossing determination process, the determination region is set to the first region 411 without imposing other conditions. However, the present invention is not limited thereto. For example, it may be determined whether or not the road shape estimated by the pedestrian crossing determination process according to the first exemplary embodiment at step S210, more specifically, a size of the intersection (curvature radius) and a size of the intersection estimated by the yaw rate received from the yaw-rate sensor 23 (or the steering angle received from the steering angle sensor 24) are coincident with each other at the step S210, and the condition that two sizes thereof are consistent with each other may be additionally imposed. When the additional condition is satisfied, the determination region may be set to the first region 411. When a size of the intersection estimated by a measurement result (target) of the millimeter wave radar 21 and the size of the intersection estimated by the yaw rate are not consistent with each other, there exists a high possible of erroneously determining that the own vehicle exists in the vicinity of the intersection or within the intersection. Accordingly, in this case, the determination region is not set to the first region, thereby not only suppressing the error detection of the moving object having the high probability of colliding with the own vehicle, but also suppressing problems such as a collision between the own vehicle and the following vehicle.

D7. Modified Example 7

In respective exemplary embodiments, during the relaxed operation mode, the braking start timing and the deceleration are relaxed in comparison with the normal operation mode, but only either one of the braking start timing and the deceleration may be relaxed as well. In this case, one operation which is not relaxed may be strengthened than the other operation. Furthermore, during the relaxed operation mode, the alert may be relaxed as well as the braking start timing and the deceleration. For example, an alert timing may be set to a time later than the time Tx. Alternatively, a volume of the alert sound may be reduced. Also, when a predetermined lamp is turned ON, luminance thereof may be lowered. Furthermore, the relaxed operation mode may be omitted, and the collision avoidance operation may be performed in the same way as the normal operation mode even while traveling in the curve.

C8. Modified Example 8

In respective exemplary embodiments, an arbitrary type of sensor that is capable of detecting whether or not an object exists or capable of detecting a position of the object by receiving a reflected waves of an electromagnetic waves of an arbitrary type such as a laser radar, and the like may be used instead of the millimeter-wave radar 21 or as well as the millimeter-wave radar 21. The aforementioned sensor corresponds to a subordinate concept of the first sensor described in the column of the technical solution.

C9. Modified Example 9

In respective exemplary embodiments, some of the configurations implemented by hardware may be replaced by software, and, conversely, some of the configurations implemented by the software may be replaced by the hardware. For example, the detection of the target performed by the millimeter-wave radar 21 may be implemented by a functional unit that may be operated by the execution of software by the ECU 10. Also, the curve determination unit 15, for example, may be implemented by an integrated circuit, a discrete circuit, or a module in which such circuits are combined. In addition, when some or all of the functions of the present disclosure are implemented by software, the software, that is to say a computer program, may be provided in a form where the software is stored in a computer-readable recording medium. The non-transitory computer-readable recording medium is not limited to a portable storage medium such as a floppy disk and a CD-ROM, but may include internal storage devices of a computer such as a RAM, a ROM, and the like, and external storage devices such as a hard disk, and the like attached to the computer. In other words, the 'computer-readable recording medium' is used in a broad sense to include an arbitrary non-transitory recording medium that can store data packet.

The present disclosure is not limited to the exemplary embodiments and modifications described hereinabove, and can be implemented in various configurations without departing from the spirit thereof. For example, technical features of each of the embodiments and modified embodiments corresponding to the technical features described in the Summary of the Disclosure column may be replaced or combined appropriately to solve some or all of the conventional problems or to achieve some or all of the advantages of the invention. Also, unless a technical feature is described as being essential in this specification, such a technical feature may be omitted appropriately.

DESCRIPTION OF SYMBOLS

100: vehicle collision avoidance support device 100
10: ECU 100
12: avoidance operation control unit 12
21: millimeter wave radar 21
22: image sensor 22

What is claimed is:

1. A vehicle collision avoidance support device, comprising:
   a state determination unit configured to determine whether or not there is a state in which a vehicle exists in a vicinity of an intersection or within an intersection that intersects with a traveling direction of the vehicle, the intersection including a likelihood of a moving object which exists and proceeds in a direction intersecting with the traveling direction of the vehicle;
   a curve determination unit configured to determine whether or not there is a state in which the vehicle is travelling on a curve of a road;
   a first sensor configured to detect an object in front of the vehicle; and
   an avoidance operation control unit configured to
      set a determination region in front of the vehicle in a perpendicular and horizontal direction to the traveling direction of the vehicle; and
      cause the vehicle to perform a predetermined avoidance operation for avoiding a collision according to a detection result of the first sensor within the determination region in front of the vehicle,
   wherein,
   when the state determination unit determines that there is the state in which the vehicle exists in the vicinity of an intersection or within an intersection, the avoidance operation control unit is configured to set a first region as the determination region,
   when the state determination unit determines that there is the state in which the vehicle does not exists in the vicinity of an intersection or within an intersection, the avoidance operation control unit is configured to set a second region as the determination region,
   the first region is wider in a perpendicular and horizontal direction to the traveling direction of the vehicle than the second region, and
   when the curve determination unit determines that the state in which the vehicle does not exist in the vicinity of an intersection or within an intersection and is travelling along the curve of the road, the avoidance operation control unit is configured to set a third region as the determination region, the third region being narrower in a perpendicular and horizontal direction to the traveling direction of the vehicle than the first region and second region.

2. The vehicle collision avoidance support device according to claim 1,
   wherein the first sensor receives reflected waves of electromagnetic waves from the object in front of the vehicle; and
   the state determination unit determines whether or not there is the state where the vehicle exists in the vicinity of an intersection or within an intersection by image recognition according to a deep neural network using information acquired from the reflected waves.

3. The vehicle collision avoidance support device according to claim 1, further comprising:
   a second sensor configured to detect a yaw rate of the vehicle or a steering angle thereof;
   a right or left turn determination unit configured to determine whether or not the vehicle performs a right turn or a left turn by using the yaw rate of the vehicle and the steering angle thereof; and
   a pedestrian crossing determination unit configured to determine whether or not a pedestrian crossing exists in front of the vehicle by using information acquired from the first sensor,
   wherein the first sensor receives reflected waves of electromagnetic waves from the object in front of the vehicle; and
   the state determination unit determines that there is the state where the vehicle exists in the vicinity of an intersection or within an intersection in response to determining that the vehicle is in a process of turning right or left after the pedestrian crossing is determined to exist.

4. The vehicle collision avoidance support device according to claim 3,
   wherein in response to determining that the pedestrian crossing exists within a predetermined time range after it is determined that there is the state where the vehicle exists in the vicinity of an intersection or within an intersection, the state determination unit sets a region to the second region for the state in which the vehicle does not exists in the vicinity of an intersection or within an intersection.

5. The vehicle collision avoidance support device according to claim 1, comprising:
   a second sensor configured to detect a yaw rate of the vehicle or a steering angle thereof; and
   the curve determination unit configured to determine whether or not the vehicle is travelling on the curve of the road based on the yaw rate of the vehicle or the steering angle thereof,
   wherein the avoidance operation control unit relaxedly performs a collision avoidance operation in response to determining that the vehicle is travelling on the curve of the road compared to determining that the vehicle is not travelling on the curve of the road.

6. The vehicle collision avoidance support device according to claim 4,
   wherein the avoidance operation includes an operation of actuating a brake in the vehicle; and
   in response to determining that the vehicle is travelling on the curve of the road, the avoidance operation control unit is configured to perform at least any one of delaying a timing of actuating the brake and reducing deceleration compared to determining that the vehicle is not travelling on the curve of the road.

7. The vehicle collision avoidance support device according to claim 2, comprising:
   a second sensor configured to detect a yaw rate of the vehicle or a steering angle thereof; and
   the curve determination unit configured to determine whether or not the vehicle is travelling on the curve of the road based on the yaw rate of the vehicle or the steering angle thereof,
   wherein the avoidance operation control unit relaxedly performs a collision avoidance operation in response to determining that the vehicle is travelling on the curve of the road compared to determining that the vehicle is not travelling on the curve of the road.

8. The vehicle collision avoidance support device according to claim 3, comprising:
   a second sensor configured to detect a yaw rate of the vehicle or a steering angle thereof; and
   the curve determination unit configured to determine whether or not the vehicle is travelling on the curve of the road based on the yaw rate of the vehicle or the steering angle thereof, wherein the avoidance operation control unit relaxedly performs a collision avoidance operation in response to determining that the vehicle is travelling on the curve of the road compared to determining that the vehicle is not travelling on the curve of the road.

9. The vehicle collision avoidance support device according to claim 4, comprising:
   a second sensor configured to detect a yaw rate of the vehicle or a steering angle thereof; and
   the curve determination unit configured to determine whether or not the vehicle is travelling on the curve of the road based on the yaw rate of the vehicle or the steering angle thereof,
   wherein the avoidance operation control unit relaxedly performs a collision avoidance operation in response to determining that the vehicle is travelling on the curve of the road compared to determining that the vehicle is not travelling on the curve of the road.

10. A vehicle collision avoidance support method, comprising the steps of:
    (a) determining whether or not there is a state where a vehicle exists in a vicinity of an intersection or within an intersection that intersects with a travelling direction of the vehicle, the intersection including a likelihood of a moving object, proceeding in a direction intersecting with the traveling direction of the vehicle, existing;
    (b) determining whether or not there is a state in which the vehicle is travelling on a curve of a road;
    (c) detecting an object in front of the vehicle; and
    (d) causing the vehicle to set a determination region in front of the vehicle in a perpendicular and horizontal direction to the traveling direction of the vehicle, and causing the vehicle to perform a predetermined avoidance operation for avoiding a collision according to a detection result of step (c) within a determination region in front of the vehicle, wherein
   in response to the state in which the vehicle exists in the vicinity of an intersection or within an intersection at step (a) being determined, the step (d) includes a step of setting a first region as the determination region,
   in response to the state in which the vehicle does not exists in the vicinity of an intersection or within an intersection at step (a) being determined, the avoidance operation control unit is configured to set a second region as the determination region, and wherein the first region is wider in a perpendicular and horizontal direction to the traveling direction of the vehicle than the second region, and
   in response to the state in which the vehicle does not exist in the vicinity of an intersection or within an intersection and is travelling along the curve of the road being determined, the avoidance operation control unit is configured to set a third region as the determination region, the third region being narrower in the perpendicular and horizontal direction to the travelling direction of the vehicle than the first region and second region.

11. The vehicle collision avoidance support device according to claim 1, wherein
    the first sensor receives reflected waves of electromagnetic waves from the object in front of the vehicle;
    an image recognizer estimates a road shape by image recognition, and
    the state determination unit is configured to determine whether or not there is a state where the vehicle exists in the vicinity or within an intersection, based on an estimated road shape, using the image recognizer according to a deep neural network using information acquired from the reflected waves.

* * * * *